US009160172B2

(12) United States Patent
Caffrey et al.

(10) Patent No.: US 9,160,172 B2
(45) Date of Patent: Oct. 13, 2015

(54) SYSTEMS AND METHODS FOR ADAPTIVE POSSIBLE POWER DETERMINATON IN POWER GENERATING SYSTEMS

(75) Inventors: Paul Oliver Caffrey, Roanoke, VA (US); Anthony William Galbraith, Wirtz, VA (US); Kuruvilla Pallathusseril Kuruvilla, Simpsonville, SC (US); James David Rackmales, Hardy, VA (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 13/271,707

(22) Filed: Oct. 12, 2011

(65) Prior Publication Data
US 2013/0096856 A1   Apr. 18, 2013

(51) Int. Cl.
G06F 19/00 (2011.01)
H02J 3/38 (2006.01)
G05B 13/04 (2006.01)

(52) U.S. Cl.
CPC .............. *H02J 3/382* (2013.01); *G05B 13/048* (2013.01); *H02J 3/383* (2013.01); *H02J 3/386* (2013.01); *Y02E 10/563* (2013.01); *Y02E 10/763* (2013.01)

(58) Field of Classification Search
CPC .. G01R 21/133; G01R 22/00; G01R 19/2513; G06Q 50/06; G01D 4/004
USPC .................................... 702/57, 60–61, 63–64
See application file for complete search history.

(56) References Cited

U.S. PATENT DOCUMENTS

| 4,672,298 | A | * | 6/1987 | Rohatyn | 323/208 |
|---|---|---|---|---|---|
| 5,202,965 | A | * | 4/1993 | Ahn et al. | 710/302 |
| 5,615,129 | A | | 3/1997 | Stich et al. | |
| 7,006,898 | B2 | * | 2/2006 | Barbir et al. | 700/286 |
| 7,925,552 | B2 | | 4/2011 | Tarbell et al. | |
| 7,932,621 | B1 | | 4/2011 | Spellman | |
| 8,239,149 | B2 | * | 8/2012 | Nuotio et al. | 702/65 |
| 8,369,803 | B2 | * | 2/2013 | Phillips et al. | 455/126 |
| 2002/0059035 | A1 | * | 5/2002 | Yagi et al. | 702/59 |
| 2008/0147335 | A1 | * | 6/2008 | Adest et al. | 702/64 |
| 2008/0298964 | A1 | * | 12/2008 | Rimmen | 416/39 |
| 2009/0088991 | A1 | * | 4/2009 | Brzezowski et al. | 702/62 |
| 2010/0198420 | A1 | * | 8/2010 | Rettger et al. | 700/291 |
| 2010/0204844 | A1 | * | 8/2010 | Rettger et al. | 700/291 |
| 2010/0332167 | A1 | | 12/2010 | Nuotio et al. | |
| 2011/0082598 | A1 | * | 4/2011 | Boretto et al. | 700/291 |

(Continued)

FOREIGN PATENT DOCUMENTS

EP   2360487 A1   8/2011

OTHER PUBLICATIONS

Knaupp, Werner, "Power Rating of Photovoltaic Modules from Outdoor Measures," Institute of Electrical and Electronics Engineers. Oct. 7, 1991, pp. 620-624,Germany.

(Continued)

*Primary Examiner* — Tung S Lau
(74) *Attorney, Agent, or Firm* — James McGinness, Esq.; Armstrong Teasdale LLP

(57) ABSTRACT

A system for determining the output capacity of a power generating system including a sensor that monitors at least one condition of the power generating system and outputs the monitored condition data, and a power capability determination device that dynamically determines a full capacity of the power generating system based upon the outputted environmental data from the electronic controller.

20 Claims, 2 Drawing Sheets

(56) References Cited

U.S. PATENT DOCUMENTS

| | | |
|---|---|---|
| 2011/0138609 A1 | 6/2011 | Cherukupalli |
| 2011/0148452 A1* | 6/2011 | Cherukupalli ............ 324/761.01 |
| 2011/0170324 A1* | 7/2011 | Hsieh et al. ...................... 363/75 |
| 2011/0184583 A1* | 7/2011 | El-Barbari et al. ............ 700/297 |
| 2011/0271989 A1* | 11/2011 | Mendez De La Cuesta . 134/198 |
| 2011/0307109 A1* | 12/2011 | Sri-Jayantha ................. 700/291 |
| 2012/0020060 A1* | 1/2012 | Myer et al. .................... 362/183 |
| 2012/0065803 A1* | 3/2012 | Teichmann et al. ........... 700/297 |

OTHER PUBLICATIONS

EP Search Report and Written Opinion issued Mar. 24, 2014 in connection with corresponding EP Patent Application No. 12187395.4.

\* cited by examiner

US 9,160,172 B2

SYSTEMS AND METHODS FOR ADAPTIVE POSSIBLE POWER DETERMINATON IN POWER GENERATING SYSTEMS

BACKGROUND OF THE INVENTION

The field of the present disclosure relates generally to systems and methods for determining a power generating capability of a power generating system.

BRIEF DESCRIPTION OF THE INVENTION

Solar, wind and other sources have increasingly become an attractive source of electrical energy and have been recognized as clean, renewable and alternative forms of energy. Such renewable energy sources may include wind, solar, geothermal, hydro, biomass, and/or any other renewable energy sources.

Due to many factors, a power generating system may not be operating at full capacity (i.e., outputting 100% of the electrical power the power generating system is capable of generating). For example, environmental conditions, such as reduced irradiance (solar power) or low winds (wind power) and the like may cause the power generating system to operate below full capacity. Mechanical, electrical and software malfunctions may also cause a power generating system to operate below full capacity. Improper maintenance, soiled, dirty and iced-over components may also cause undesirable reductions in power output. Additionally, intentional curtailment of output power by a system operator may be initiated to reduce the power generating system to operate below full capacity. Combinations of such factors that reduce power output below full capacity are also possible.

When a power generating system operates below full capacity, revenue may be lost due to the loss of value of the energy not being produced. Due to contractual obligations between power producers and grid operators, the circumstances affecting below full capacity operation may affect financial liability of such lost revenue. For example, intentional curtailment to limit power output may obligate the party who curtailed the power output. In other situations, such as lack of maintenance, or malfunctioning equipment, one or more parties may be responsible for the lost revenues attributable to the below full capacity operation. Typical models used for determining full capacity of power generating systems are based upon ideal conditions and do not account for changing environmental conditions and degradation of components. Typical models may thus provide inaccurate determinations of the full capacity of a power generating system.

BRIEF DESCRIPTION OF THE INVENTION

Figure 1:
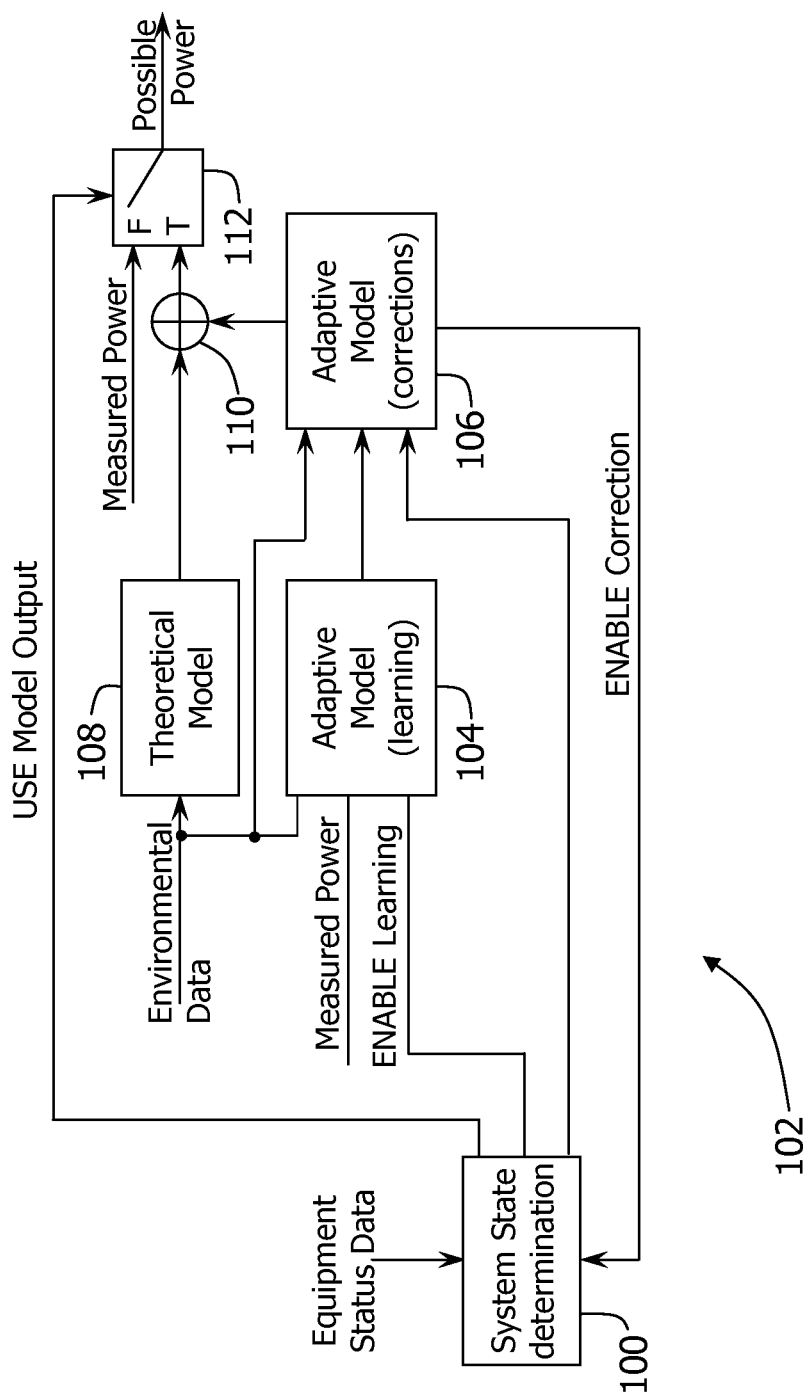
FIG. 1 is an exemplary block diagram of a power generation capability system of the present disclosure.

In one aspect, a system for determining the output capacity of a power generating system comprises a power measuring device in communication with the power generating system that determines an instantaneous power output level of the power generating system. A sensor monitors at least one condition of the power generating system and outputs the monitored condition data and a power capability determination device dynamically determines a full capacity of the power generating system based upon the outputted environmental data from the electronic controller.

In another aspect, a method for determining an output capacity of a power generating comprises measuring an instantaneous power output level of the power generating system, monitoring at least one condition of the power generating system and outputting the monitored condition data and determining a full capacity of the power generating system based upon the monitored condition data.

In a further aspect, a non-transitory computer-readable storage medium storing a program comprising a method for determining the output capacity of a power generating system comprises measuring an instantaneous power output level of the power generating system. At least one condition of the power generating system is monitored and the monitored condition data is outputted. A full capacity of the power generating system is determined based upon the monitored condition data.

DETAILED DESCRIPTION OF THE INVENTION

The systems and methods for determining a power generating capability of a power generating system according to the present disclosure are capable of providing information to an operator regarding the possible full capacity of the power generating system. Systems and methods described herein may employ adaptive models, which provide a learning and corrective ability to making the determination of power generating capability. Thus the systems and methods described herein are capable of providing the ability to, for example, account for degradation, environmental conditions, system anomalies and the like.

In the power generation industry, for example the photovoltaic (PV) (e.g., solar power) generation industry, the power produced by the PV modules may be direct-current (DC) power. The DC power is converted through suitable electronics to alternating current (AC) for export to a power grid. One design feature of the converting electronics is their ability to modulate the DC voltage on which the PV modules act so as to maximize the instantaneous power output of the system. Operation of the system in this manner maximizes the conversion efficiency of the system and is the normal mode of operation.

However, in certain cases the system may not be operating in the manner that maximizes the conversion efficiency. For instance, any of the following reasons may lead to the system not operating at a maximum conversion efficiency: the system has been turned off intentionally by an operator; one or more devices in the system are malfunctioning; the system has been intentionally curtailed by an operator to limit the power being produced, and environmental factors such as temperature, wind conditions, soiled components, irradiance and the like.

In any of the above circumstances the operator of the system may have a desire to know how much power the system might have produced (i.e., the full capacity) if it had been operating normally and/or in ideal environmental conditions. The full capacity information may be used to generate certain quantifiable metrics that characterize operation of the system over a given time period as well as the environment the system is operating in. The information may also be used in conjunction with terms of a commercial agreement to adjust payments made by or to the system owner or operator.

The described embodiments of the present disclosure allow the system operator to determine, in real time, the amount of power that could have been generated vis-à-vis the instantaneous power that is being generated by the system. Such data facilitates timing of when to begin and end maintenance on the system. Further, the data may also be stored and aggregated over a time period to characterize performance of the system over time. Additionally, the data may also be used in conjunction with weather forecasting to estimate future power production from the facility, allowing grid operators the ability to better balance power demand with power generating capacity.

Figure 2:
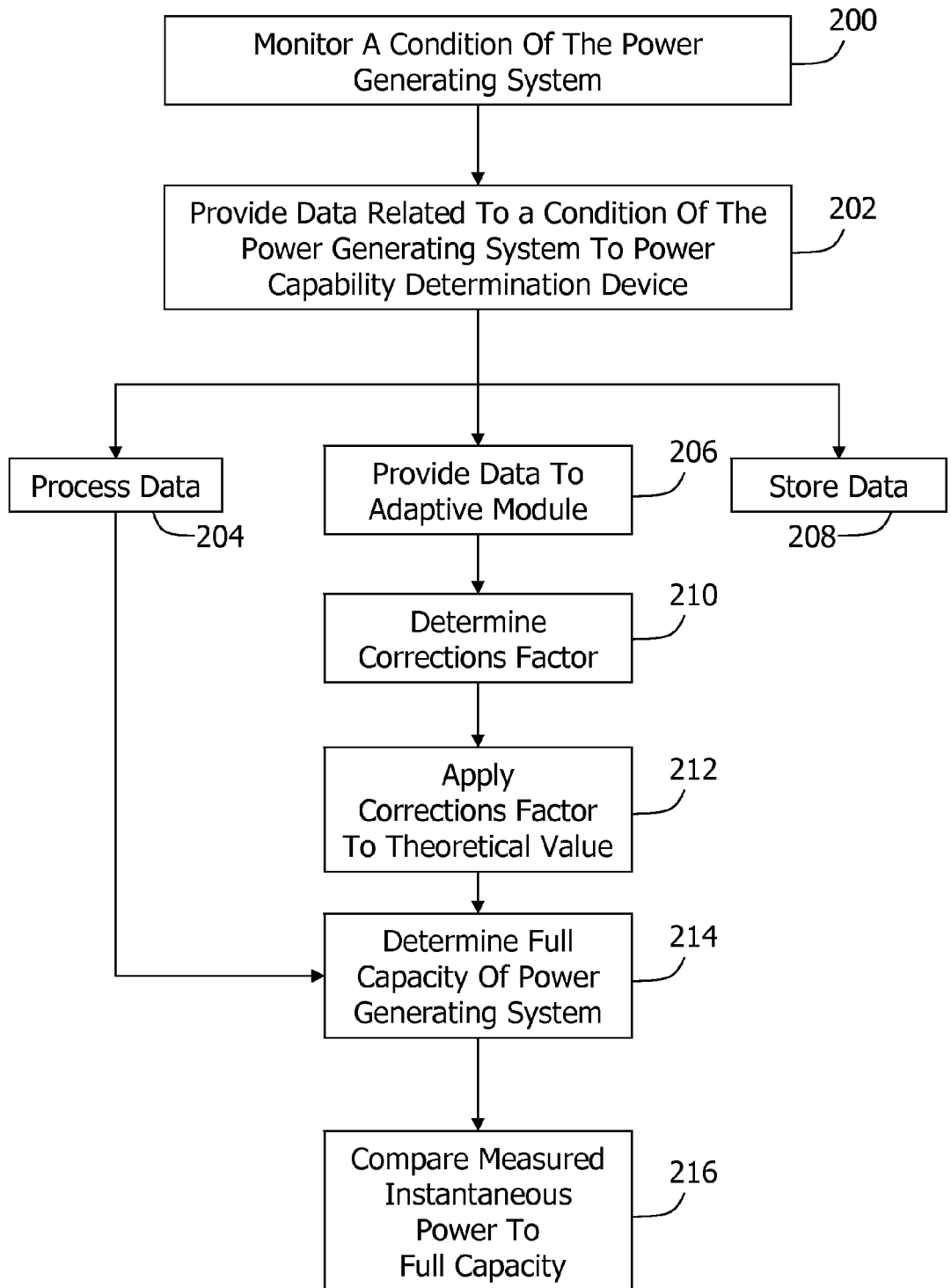
FIG. 2 is a flowchart of an exemplary embodiment of the present disclosure.

FIG. 1 shows an exemplary embodiment of a system for determining the output capacity of a power generating system according to the present disclosure. As shown in FIGS. 1 and 2, monitored equipment status data 200 is provided to a system state determination module 100 of the power capability determination device 102 at step 202. Equipment status includes, for example, monitored data related to a condition of the power generating system components, as shown at step 200 of FIG. 2. Such data may include an indication of whether components of the system are on-line, warming-up, operating normally, malfunctioning and the like. Further, environmental data is provided to power capability determination device 102. Such environmental data includes, for example, operating conditions of one or more components of the power generating system. In one embodiment, temperature sensors (not shown) provide ambient air temperature readings of the PV modules. In other embodiments, additional data is provided by sensors, including but not limited to, an amount of cloud cover, irradiance levels, an amount of soil cover on power generating modules, rain data, humidity levels, barometric pressure and any other parameters that allow the systems and methods of the present disclosure to operate as described herein.

In one embodiment, as shown at steps 204, 206, and 208, system state determination module 100 receives the equipment status data and processes, combines, analyzes, stores and/or provides one or more of the equipment status conditions to adaptive learning module 104 and/or adaptive model corrections module 106. In another embodiment, the environmental data may is provided to adaptive learning module 104.

In one embodiment, adaptive learning module 104 provides a learning function that facilitates making a determination on the full capacity power production of the system. In another embodiment, adaptive learning module 104 is configured to adapt to the physical traits of the system. For example, adaptive learning module 104 correlates the equipment status data and instantaneous power data to develop system power data over time. As another example, the adaptive learning module 104 correlates an environmental condition, such as 30% cloud cover, to a given instantaneous power (e.g., 30% reduction in output power). A further example is a correlation between the number of years of use of a PV cell with a percent degradation in performance (e.g., after 3 years of use, a PV module may generate only 95% of the power it generates when new). Adaptive learning module 104 thus is capable of providing degradation trends, instantaneously and over a time period. The learning capability and correlations, and the learning module are capable of correlating any given data in a manner that allows the systems and method disclosed herein to operate as described. Over time, a large database of information from adaptive learning module 104 may be stored, thus providing the ability to anticipate a future instantaneous power with anticipated environmental conditions.

In one embodiment, data provided by adaptive learning module 104 is used directly (e.g., output to a display or printed) or provided to a corrections module 106. In another embodiment, corrections module 106 utilizes data output from the adaptive learning module 104 to calculate a corrections factor 210 for a theoretical full capacity of the power generating system. For example, corrections module 106 calculates a corrections factor based upon a look-up table, which compares given adaptive learning module output values to corrections factors. In yet another embodiment, the performance characteristics of individual modules (such as individual PV modules) of the power system are programmed into corrections module 106 along with additional system characteristics such as, for example, line losses, converter efficiency data at various operating points and/or correction factors for non-measured environmental data, such as component degradation and module soiling (e.g., dirt, ice, bugs and the like) accumulation data. In embodiments, the performance characteristics are associated with, for example in a look-up table, one or more corresponding corrections factors. Implementation of the corrections factors is further discussed below.

In one embodiment, power capability determination device 102 includes a theoretical power production module 108. Theoretical power production module 108 calculates a theoretical full capacity of the power generating system for given environmental conditions. In one embodiment, theoretical power production module 108 calculates the theoretical full capacity based upon one or more of manufacturer provided specifications, experimental test data, ideal operating conditions data and the like.

In one embodiment, power capability determination device 102 combines, in a combination module 110, the theoretical power output from theoretical power module 108 with a correction factor output from corrections module 106. The corrections factor modifies 212 the theoretical power output values in a manner that provides a more realistic estimate of the possible power (full capacity) 214 that the power generating system could produce at a given time. Thus, the estimated full capacity value outputted from combination module 110 may be an adjusted value of the theoretical full capacity that takes into account the factors supplied to adaptive learning module 104 and corrections module 106.

In one embodiment, a system operator or a comparison device 112 compares 216 the instantaneous measured power of the system with the estimated possible power (estimated full capacity) that the system could be producing. For example, this allows the operator to account for a variance in the instantaneous power to the theoretical full capacity. As another example, an operator gathers from the data, that due to system degradation, the PV modules are underproducing compared to a theoretical full capacity (i.e., which may not take into account module soiling and degradation), but are producing power in-line with the estimated full capacity provided by the combination module 110 (e.g., a corrected possible power estimate that takes into account the module soiling and degradation).

Such output from power capability determination device 102, is capable of providing a system operator the ability to quantify the revenue lost due to the power generating system generating an instantaneous power below the estimated full capacity (e.g., due to operator curtailment or a component malfunction). Further, the operator may use the estimated full capacity to transiently curtail the power generating system during a grid event (e.g., a low voltage ride through (LVRT) event), or when the power grid cannot accept power.

In one embodiment, the estimated full capacity is used to automatically, or manually, disconnect portions of the power generating system (e.g., disconnect one or more PV modules) to reduce possible power output, for example during inclement weather, during high DC:AC ratios and/or during a grid event.

In one embodiment, the power generating system is configured to allow for a pre-emptive curtailment of the power generating system to allow for pseudo-stored energy for a controlled down ramp (e.g., during cloud passage). For example, the power generating system is configured to be preemptively curtailed in anticipation of cloud passage (i.e., a transient event) over a PV array or for a grid under frequency support (i.e., solar inertia), thus smoothing power production levels during transient events.

In certain situations, system operators may be required to use the capacity of a system's inverters to produce reactive power (VAR) in lieu of real power (kW) or the inverters may be commanded to temporarily reduce their real power output in response to an over frequency condition on the grid. In one embodiment, the power generating system includes a plurality of substantially identical arrays (i.e., arrays capable of producing a substantially similar power output) and power inverters are employed. The power generating system is configured to allow a portion of the inverters to run un-curtailed to determine the full capacity of the un-curtailed arrays and to export the power generated by the un-curtailed arrays. The remaining portion of the inverters are commanded to run at a curtailed level (e.g., a predetermined proportion of the full capacity of the un-curtailed arrays). Such operation allows for the possibility of facilitating a dynamic energy reserve (e.g., storage) of power without requiring the use of batteries or other storage devices. The reserved power is exported in the event of a grid under-frequency condition or the like.

In some embodiments, power capability determination device 102 is configured to signal or initiate a diagnostic evaluation if the measured power is not within a range when compared to the estimated full capacity. Alternatively, or in addition thereto, power capability determination device 102 is configured to provide the ability for incidental correlation. For example, adaptive learning module 104 is configured to account for anomalies, such as an instant increase/decrease in system performance. Such instant increase/decrease in performance are due, for example, to rain washing dirt off of PV modules, or PV module damage due to a hail storm or the like.

In some embodiments, adaptive learning module 102 is resettable. For example, after an event such as a maintenance event, the adaptive learning module 104 is reset to account for improved performance attributable to the maintenance event.

In embodiments, the systems and method disclosed herein may be incorporated into a computer or stored on a computer readable medium. Alternatively, or in addition thereto, the values output by any of the above modules and systems are output to a display device or printed for viewing by an operator. In one embodiment, a data storage device is connected to power capability determination device 102 to store one or more values provided by the power capability determination device 102.

In one embodiment, power capability determination device 102 is configured to allow for overperforming components (e.g., overperforming inverters) to offset underperforming components (e.g., underperforming inverters) at the plant level.

In embodiments, the above systems and methods may be implemented for power generation modules for wind, solar, geothermal, hydro, biomass, and/or any other renewable or non-renewable energy sources, and the like.

The embodiments described herein are not limited to any particular system controller or processor for performing the processing tasks described herein. The term controller or processor, as used herein, is intended to denote any machine capable of performing the calculations, or computations, necessary to perform the tasks described herein. The terms controller and processor also are intended to denote any machine that is capable of accepting a structured input and of processing the input in accordance with prescribed rules to produce an output. It should also be noted that the phrase "configured to" as used herein means that the controller/processor is equipped with a combination of hardware and software for performing the tasks of embodiments of the invention, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

The embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Any and all of the technical features described herein may translate into improved profitability of the power generating system. For example, the system owner may include terms in their commercial agreements to be compensated for power that wasn't produced due to grid constraints. The system owner or operator may also be able to manage commercial risk by requesting power guarantees from equipment suppliers and receiving compensation for unproduced power when equipment malfunctions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for determining the output capacity of a power generating system, comprising:
    a sensor configured to monitor at least one condition of the power generating system and output the monitored condition data; and
    a power capability determination device configured to:
        receive the outputted monitored condition data and dynamically determine a theoretical full capacity value of the power generating system based upon the received monitored condition data;
        determine a correction factor value at least partially based on the received monitored condition data and non-measured data including power generation module degradation data; and
        combine the correction factor value with the determined theoretical full capacity value to generate an estimated full capacity value.

2. A system according to claim 1, wherein the power generating system includes at least one power generation module, wherein the correction factor value is further at least partially based on non-measured data including power generation module soiling data.

3. A system according to claim 1, further comprising a power measuring device in communication with the power generating system, said power measuring device configured to determine an instantaneous power output level of the power generating system.

4. A system according to claim 3, wherein said power capability determination device comprises:
    a theoretical performance module configured to output the theoretical full capacity value of the power generating system; and
    an adaptive learning module configured to determine performance metrics based upon the instantaneous power values accumulated over a time period and output the correction factor value configured to adjust the theoretical full capacity value based upon the performance metrics.

5. A system according to claim 4, wherein said adaptive learning module is selectably activated and resettable.

6. A system according to claim 5, wherein said adaptive learning module is configured to be reset after completion of a maintenance operation.

7. A method for determining an output capacity of a power generating system, said method comprising:
    monitoring at least one condition of the power generating system and outputting the monitored condition data to a power capability determination device;
    determining, by the power capability determination device, a theoretical full capacity value of the power generating system based upon the monitored condition data;
    determining, by the power capability determination device, a correction factor value at least partially based on the received monitored condition data and non-measured data including power generation module degradation data; and
    combining, by the power capability determination device, the correction factor value with the determined theoretical full capacity value thereby generating an estimated full capacity value.

8. A method according to claim 7, wherein the power generating system includes at least one power generation module, wherein the correction factor value is further at least partially based on non-measured data including power generation module soiling data.

9. A method according to claim 7, further comprising measuring an instantaneous power output level of the power generating system.

10. A method according to claim 9, further comprising:
    determining a theoretical performance of the power generating system;
    accumulating the instantaneous power values over a time period;
    determining performance metrics based upon the instantaneous power values accumulated over the time period; and
    applying the correction factor that adjusts the theoretical performance based upon the performance metrics.

11. A method according to claim 9, further comprising comparing the instantaneous power output level of the power generating system with the estimated full capacity value comprising at least one of:
    initiating a diagnostic evaluation of the power generation system;
    curtailing the instantaneous power output level of the power generating system below the estimated full capacity value; and,
    quantifying a value of revenue lost due to the power generating system generating an instantaneous power output level below the estimated full capacity value.

12. A method according to claim 10, further comprising selectively determining the performance metrics for a time during which the power generating system is operating without an equipment malfunction.

13. A method according to claim 11, wherein curtailing the instantaneous power output level of the power generating system below the estimated full capacity value comprises disconnecting at least a portion of the power generation system.

14. A method according to claim 11, wherein curtailing the instantaneous power output level of the power generating system below the estimated full capacity value comprises at least one of:
    riding through a low voltage grid event;
    riding through periods when a power grid coupled to the power generating system cannot accept power generated by the power generating system;
    anticipating transient events including at least one of cloud passage and over-frequency conditions on the power grid; and,
    increasing reactive power generation by the power generating system.

15. A method in accordance with claim 11, wherein curtailing the instantaneous power output level of the power generating system below the estimated full capacity value comprises maintaining the instantaneous power output level of a first portion of the power generating system and curtailing the instantaneous power output level of a second portion of the power generating system, thereby establishing a dynamic power reserve.

16. A non-transitory computer-readable storage medium storing a program comprising computer instructions for performing a method for determining the output capacity of a power generating system, said method comprising:
- monitoring at least one condition of the power generating system and outputting the monitored condition data;
- determining a theoretical full capacity value of the power generating system based upon the monitored condition data;
- determining a correction factor value at least partially based on the monitored condition data and non-measured data including power generation module degradation data;
- combining the correction factor value with the determined theoretical full capacity value, thereby generating an estimated full capacity value; and
- measuring an instantaneous power output level of the power generating system and comparing the estimated full capacity of the power generating system and the instantaneous power output level of the power generating system.

17. A non-transitory computer-readable storage medium according to claim 16, wherein the power generating system includes at least one power generation module, wherein the correction factor value is further at least partially based on non-measured data including power generation module soiling data.

18. A non-transitory computer-readable storage medium according to claim 16, said method further comprising:
- determining a theoretical performance of the power generating system;
- accumulating instantaneous power values over a time period;
- determining performance metrics based upon the instantaneous power values accumulated over the time period; and
- applying the correction factor that adjusts the theoretical full capacity based upon the performance metrics.

19. A non-transitory computer-readable storage medium according to claim 18, said method further comprising selectively determining the performance metrics for a time during which the power generating system is operating without an equipment malfunction.

20. A non-transitory computer-readable storage medium according to claim 18, said method further comprising storing the monitored condition data and full capacity data in a data storage device.

\* \* \* \* \*